_Patented Mar. 16, 1948_                                                                              2,437,993

UNITED STATES PATENT OFFICE 2,437,993

FLUORINATION OF ACYCLIC OLEFINIC COMPOUNDS

Anthony F. Benning, Woodstown, N. J., and Joseph D. Park, Wilmington, Del., assignors to E. I. du Pont de Nemours & Company, Wilmington, Del., a corporation of Delaware No Drawing. Application July 12, 1946, Serial No. 683,140

20 Claims. (Cl. 260—653)

1

This invention relates to the preparation of fluorine compounds and more particularly to a method for preparing such compounds by the addition of fluorine to olefinic compounds.

Organic fluorine compounds have generally been prepared by the substitution of chlorine or bromine by fluorine. Some organic fluorine compounds have also been prepared by the addition of hydrogen fluoride to an olefine and by the addition of hydrogen chloride or hydrogen bromide to a fluorinated olefine. These processes generally produce unsymmetrical fluorinated compounds and do not produce certain types of valuable compounds. For example, they will not, in general, produce the type of compound which would be produced theoretically by the addition of two fluorine atoms at the double bond of an olefinic compound. No satisfactory method has been known heretofore for the addition of two fluorine atoms to a double bond of an acyclic olefinic compound.

It is an object of the present invention to provide a method for the preparation of organic fluorine compounds by the addition of two fluorine atoms to a double bond of an acyclic olefinic compound. Another object is to provide such a method whereby compounds, not readily obtainable by methods known heretofore, may be readily obtained in substantial yields. A further object is to provide a method for the preparation of $CF_3CClFCCl_2F$. A still further object is to provide a novel and improved method for making $CCl_2FCCl_2F$. Other objects are to advance the art. Still other objects will appear hereinafter.

The above and other objects may be accomplished in accordance with our invention which comprises reacting an olefinic compound with hydrogen fluoride and a metal oxide of the group of $Co_2O_3$ and $MnO_2$ in a closed reaction vessel under conditions such that two atoms of fluorine are added to the double bond of the olefinic compound. We have found that, if an acyclic olefinic compound, which consists of carbon and at least one of the members of the group consisting of hydrogen, chlorine, bromine and fluorine, is mixed with HF and one of $Co_2O_3$ and $MnO_2$ at a temperature below 0° C., in such proportions that there is at least 0.5 mole of the olefinic compound and at least 5 moles of HF to each mole of the metal oxide and causing the mixture to react in a closed vessel by causing the temperature to rise above 0° C., two fluorine atoms will be added to the double bond of the olefinic compound. By this method, we are able to prepare

2 in substantial yields from $CF_3CCl=CCl_2$. Also, by this method, we are able to readily prepare

in substantial yields without admixture with its isomer. Still other compounds, obtainable with difficulty heretofore, may be readily prepared by this method.

The acyclic olefinic compounds, which may be treated in accordance with our invention, are those which consist of carbon and at least one of the members of the group consisting of hydrogen, chlorine, bromine and fluorine, that is, they are olefines, chloro olefines, chloro fluoro olefines, fluoro olefines, bromo olefines, bromo-fluoro olefines, bromo-chloro olefines and bromo-chlorofluoro olefines. Such terms are employed in their ordinarily understood sense. For example, an olefin consists of carbon and hydrogen and contains one or more double bonds, a chloro olefine is an olefine in which at least one hydrogen atom has been substituted by chlorine solely and a chloro-fluoro olefine is an olefine in which at least one hydrogen atom has been replaced by chlorine and at least one other hydrogen atom has been replaced by fluorine solely. Our invention is particularly concerned with the treatment of the acyclic chloro-fluoro olefines and the acyclic chloro olefines and especially those in which all of the hydrogens of the olefine have been replaced by the halogen. The following are representative of the olefinic compounds which may be treated in accordance with our invention:

| | |
|---|---|
| $CF_3CCl=CCl_2$ | $CF_3CCl=CClCF_3$ |
| $CF_3CCl=CFCl$ | $CF_3CH=CH_2$ |
| $CCl_2=CCl_2$ | $CF_3CH=CHCF_3$ |
| $CHCl=CCl_2$ | $CF_3CH_2CH=CH_2$ |
| $CHCl=CHCl$ | $CH_2=CH_2$ |
| $CF_3CCl=CF_2$ | $CH_2=CHCH_3$ |
| $CFCl_2CF=CF_2$ | $CF_2=CF_2$ |
| $CCl_2=CClCCl=CCl_2$ | |

The olefinic compound will be mixed with the metal oxide in the proportion of at least 0.5 mole of the olefinic compound for each mole of the metal oxide. Generally, there will be from about 1 to about 4 moles of the olefinic compound to each mole of the metal oxide and preferably in the ratio of about 2 to 1. Large excesses of the olefinic compound may be used, but without advantage.

The hydrogen fluoride will generally be used in the proportion of at least 5 moles to each mole of the metal oxide. Proportions of from about 5 moles to about 30 moles of HF for each mole of metal oxide have been employed with satisfactory results. Still larger excesses of HF may be employed, if desired. Preferably, however, there will be employed from about 10 to about 20 moles of HF for each mole of metal oxide.

The reaction is exothermic, but is quite slow at temperatures below 0° C. In the absence of cooling sufficient to dissipate the heat as fast as it is generated, the mixture will slowly warm up with acceleration of the reaction until, at a temperature above 0° C., the reaction becomes quite vigorous, rapidly generating large amounts of heat. The temperature, at which the vigorous exothermic reaction takes place, will depend upon the particular olefinic compound employed and the size and shape of the charge and of the reaction vessel. Generally, however, such temperature is between 5° C. and 100° C. and usually between 5° C. and 60° C.

We have found that, in order to successfully carry out the reaction with the production of substantial yields of the desired compounds, the metal oxide, hydrogen fluoride and olefinic material should be mixed together in the desired proportions at a temperature below 0° C. and the reaction carried out in a closed reaction vessel. Preferably, the reactants are mixed at a temperature below $-14°$ C. and particularly at a temperature of from about $-15°$ C. to about $-78°$ C., so as to provide a margin of safety for the closing of the vessel before the vigorous reaction starts.

The reaction vessel should be one which will withstand high pressures, as high autogenous pressures are generated due to the high temperatures produced and the volatility of the reactants. The reaction vessel may be constructed of any metal which does not readily react with fluorine or hydrogen fluoride. Suitable metals are silver, nickel, Inconel, platinum and iron. The body of the vessel may be made of other metals and lined with the non-reactive metal. The vessel will usually be provided with means for agitation and a reflux column. Usually, the reaction vessel will be provided with means for cooling to the desired temperature for mixing so that the ingredients may be mixed directly in the reaction vessel.

After the ingredients are mixed and the vessel is closed, the temperature of the mixture is caused to rise above 0° C. to that at which the reaction proceeds rapidly. This may be accomplished by removing the cooling from the vessel and allowing the heat, generated by the reaction, to slowly raise the temperature the desired amount. If desired, the rise in temperature may be assisted by applying heat to the vessel. Due to the heat generated in the reaction, the temperature of the mixture at the completion of the vigorous reaction will be substantially higher than that at which the vigorous reaction starts. It will usually be desirable to maintain the mixture at or above such temperature for a substantial period of time so as to complete the reaction as far as possible. Preferably, after the vigorous reaction has subsided, the mixture is heated up to about 200° C. and maintained at that point for several hours so as to insure completion of the reaction.

The reaction products, consisting essentially of excess HF, fluorinated organic material, unreacted olefin and metal compounds, may be treated by various methods to separate and recover the valuable ingredients. The organic material and HF may be distilled out of the autoclave and then subjected to anhydrous fractional distillation to separate substantially anhydrous HF from the organic material. Alternatively, the organic material and HF may be distilled out of the reaction vessel and passed directly through scrubbers to remove acidic constituents, followed by collection of the acid-free organic material in vessels cooled to the appropriate temperatures. The organic material may then be subjected to fractional distillation. The organic constituents may be separated from each other and from HF by fractional condensation. The metal compounds may be discarded or subjected to hydrolysis and dehydration to obtain metal oxides for reuse in the process.

In order to more clearly illustrate our invention preferred modes of carrying the same into effect and the advantageous results to be obtained thereby, the following examples are given:

Example I

Into a steel autoclave, cooled to carbon-ice acetone temperature, about $-78°$ C., were charged one mole of tetrachloroethylene, one mole cobaltic oxide ($Co_2O_3$) and seven mole of anhydrous hydrogen fluoride. The reaction mixture was allowed to come to room temperature and then digested at 200° C. for six hours with agitation. After cooling to $-30°$ C., the pressure was released and the reaction mass drowned in ice water and steam distilled. The resulting organic layer was separated, dried over calcined calcium sulfate and fractionated. Fractionation yielded 0.32 mole of $CFCl_2$—$CFCl_2$ with the following constants: B. P. 92.8° C. at 760 mm. of Hg; M. P. 26.5° C.; $n_D^{30°\,C.} = 1.4115$. As by-products, the compounds $CHCl_2$—$CCl_2F$ and $CCl_2F$—$CClF_2$ were obtained.

Example II

One mole of $CCl_2=CClCF_3$ was placed in a steel autoclave (cooled to carbon-ice acetone temperature, about $-78°$ C.) with 0.54 mole of manganese dioxide ($MnO_2$) and 10 moles of anhydrous hydrogen fluoride. After warming up to room temperature, the autoclave was heated at 200° C. for six hours with agitation. The reaction vessel was then cooled to $-30°$ C., the pressure released and the reaction mass passed through water, then through calcined $CaSO_4$ and condensed. This condensate was then subjected to fractionation. About 0.2 mole of $CF_3CClFCCl_2F$ with the boiling range of 73° to 73.5° C. at 760 mm. of Hg was obtained. The major portion of the recovered material was unreacted starting material $$CF_3CCl=CCl_2$$

Example III

A reaction with 1 mole of $CHCl=CCl_2$, 0.4 mole of $MnO_2$ and 8 moles of HF was carried out under conditions similar to that described in Example II. About 0.1 mole of $CHClFCCl_2F$, boiling at 72°–73° C., was isolated and identified. By-product $CHCl_2CHClF$ was also identified.

It will be understood that the preceding examples are given for illustrative purposes solely and we do not intend to restrict our invention to the specific embodiments disclosed therein, but intend to cover our invention broadly as in the appended claims. Many variations and modifications may be made in the process without departing from the spirit or scope of our invention. For example, other acyclic olefinic compounds may be employed in place of those specifically mentioned.

Metal oxides, in general, are not effective in this process and it could not be predicted which metal oxides would produce the desired results. For example, attempts to obtain the symmetrical addition of fluorine to olefins, such as $CF_3CCl=CCl_2$, $CCl_2=CCl_2$ and $CHl=CHCl$, by employing in the process other metal oxides, such as $Ni_2O_3$, $TiO_2$ and $Sb_2O_5$, were unsuccessful.

This invention provides a novel method for preparing organic fluorine compounds. It provides a method for the symmetrical addition of fluorine to olefinic compounds, permitting the synthesis of compounds heretofore difficult and tedious or impossible to prepare. For example, it provides a new and more efficient method for the preparation of $CCl_2FCCl_2F$. Prior to our invention, $CCl_2FCCl_2F$ was obtained with difficulty as an intermediate in the preparation of $CClF_2CCl_2F$ from $C_2Cl_6$ and antimony fluorides and then in very small yields admixed with the isomer $CClF_2CCl_3$. By our process, two fluorines are symmetrically added to $CCl_2=CCl_2$ with the formation of $CCl_2FCCl_2F$ without admixture with the isomer. Also, by our method, $CF_3CClFCCl_2F$ is readily obtained from $CF_3CCl=CCl_2$.

The products of the reaction are useful for various commercial purposes. They may be used as refrigerants and as intermediates for the preparation of fluorine-containing olefines and perfluorinated olefines, useful in the production of fluoro polymers and interpolymers. The compounds, produced by our method, may also be used as solvents and reaction media. Furthermore, by our invention, we have provided a method whereby two fluorine atoms are added to olefinic compounds by an economical one-step process, not known or used heretofore.

We claim:

1. The process of adding fluorine to a double bond of an acyclic olefinic compound which consists of carbon and at least one of the members of the group consisting of hydrogen, chlorine, bromine and fluorine which comprises mixing, in a reaction vessel at a temperature below 0° C., at least 0.5 mole of the olefinic compound and at least 5 moles of HF with one mole of a member of the group consisting of $Co_2O_3$ and $MnO_2$, closing the reaction vessel, causing the temperature to rise above 0° C. to that at which the reaction proceeds rapidly, maintaining the mixture at at least the latter temperature until the reaction is complete and then separating the products.

2. The process of adding fluorine to a double bond of an acyclic olefinic compound which consists of carbon and at least one of the members of the group consisting of hydrogen, chlorine, bromine and fluorine which comprises mixing, in a reaction vessel at a temperature below —14° C., at least 0.5 mole of the olefinic compound and at least 5 moles of HF with one mole of a member of the group consisting of $Co_2O_3$ and $MnO_2$, closing the reaction vessel, causing the temperature to rise above 0° C. to that at which the reaction proceeds rapidly, maintaining the mixture at at least the latter temperature until the reaction is complete and then separating the products.

3. The process of adding fluorine to a double bond of an acyclic olefinic compound which consists of carbon and at least one of the members of the group consisting of hydrogen, chlorine, bromine and fluorine which comprises mixing, in a reaction vessel at a temperature below 0° C., at least 0.5 mole of the olefinic compound and from about 5 to about 30 moles of HF with one mole of a member of the group consisting of $Co_2O_3$ and $MnO_2$, closing the reaction vessel, causing the temperature to rise above 0° C. to that at which the reaction proceeds rapidly, maintaining the mixture at at least the latter temperature until the reaction is complete and then separating the products.

4. The process of adding fluorine to a double bond of an acyclic olefinic compound which consists of carbon and at least one of the members of the group consisting of hydrogen, chlorine, bromine and fluorine which comprises mixing, in a reaction vessel at a temperature below —14° C., from about 1 to about 4 moles of the olefinic compound and from about 5 to about 30 moles of HF with one mole of a member of the group consisting of $Co_2O_3$ and $MnO_2$, closing the reaction vessel, causing the temperature to rise above 0° C. to that at which the reaction proceeds rapidly, maintaining the mixture at at least the latter temperature until the reaction is complete and then separating the products.

5. The process of adding fluorine to a double bond of an acyclic olefinic compound which consists of carbon and at least one of the members of the group consisting of hydrogen, chlorine, bromine and fluorine which comprises mixing, in a reaction vessel at a temperature of from about —15° C. to about —78° C., from about 1 to about 4 moles of the olefinic compound and from about 10 to about 20 moles of HF with one mole of a member of the group consisting of $Co_2O_3$ and $MnO_2$, closing the reaction vessel, causing the temperature to rise to a temperature of from 0° C. to about 200° C. at which the reaction proceeds rapidly, maintaining the mixture at at least the latter temperature until the reaction is complete and then separating the products.

6. The process of adding fluorine to a double bond of an acyclic chloro-fluoro olefin which comprises mixing, in a reaction vessel at a temperature below 0° C., at least 0.5 mole of the olefin and at least 5 moles of HF with one mole of a member of the group consisting of $Co_2O_3$ and $MnO_2$, closing the reaction vessel, causing the temperature to rise above 0° C. to that at which the reaction proceeds rapidly, maintaining the mixture at at least the latter temperature until the reaction is complete and then separating the products.

7. The process of adding fluorine to a double bond of an acyclic chloro-fluoro olefin which consists of carbon, chlorine and fluorine which comprises mixing, in a reaction vessel at a temperature below —14° C., from about 1 to about 4 moles of the olefin and from about 5 to about 30 moles of HF with one mole of a member of the group consisting of $Co_2O_3$ and $MnO_2$, closing the reaction vessel, causing the temperature to rise above 0° C. to that at which the reaction proceeds rapidly, maintaining the mixture at at least the latter temperature until the reaction is complete and then separating the products.

8. The process of adding fluorine to a double bond of an acyclic chloro-fluoro olefin which consists of carbon, chlorine and fluorine which comprises mixing, in a reaction vessel at a temperature of from about —15° C. to about —78° C., from about 1 to about 4 moles of the olefin and from about 10 to about 20 moles of HF with one mole of a member of the group consisting of $Co_2O_3$ and $MnO_2$, closing the reaction vessel, causing the temperature to rise to a temperature of from 0° C. to about 200° C. at which the reaction proceeds rapidly, maintaining the mixture at at least the latter temperature until the reaction is complete and then separating the products.

9. The process of making CF₃CClFCCl₂F by adding fluorine to the double bond of

CF₃CCl=CCl₂ which comprises mixing, in a reaction vessel at a temperature below 0° C., at least 0.5 mole of the CF₃CCl=CCl₂ and at least 5 moles of HF with one mole of a member of the group consisting of Co₂O₃ and MnO₂, closing the reaction vessel, causing the temperature to rise above 0° C. to that at which the reaction proceeds rapidly, maintaining the mixture at at least the latter temperature unil the reaction is complete and then separating the CF₃CClFCCl₂F from the reaction mixture.

10. The process of making CF₃CClFCCl₂F by adding fluorine to the double bond of

CF₃CCl=CCl₂ which comprises mixing in a reaction vessel at a temperature of from about −15° C. to about −78° C., from about 1 to about 2 moles of the CF₃CCl=CCl₂ and from about 10 to about 20 moles of HF with one mole of a member of the group consisting of Co₂O₃ and MnO₂, closing the reaction vessel, causing the temperature to rise to a temperature of from 0° C. to about 200° C. at which the reaction proceeds rapidly, maintaining the mixture at at least the latter temperature until the reaction is complete and then separating the CF₃CClFCCl₂F from the reaction mixture.

11. The process of adding fluorine to a double bond of an acyclic chloro olefin which comprises mixing, in a reaction vessel at a temperature below 0° C., at least 0.5 mole of the olefin and at least 5 moles of HF with one mole of a member of the group consisting of Co₂O₃ and MnO₂, closing the reaction vessel, causing the temperature to rise above 0° C. to that at which the reaction proceeds rapidly, maintaining the mixture at at least the latter temperature until the reaction is complete and then separating the products.

12. The process of adding fluorine to a double bond of an acyclic chloro olefin consisting of carbon and chlorine which comprises mixing, in a reaction vessel at a temperature below 0°C., at least 0.5 mole of the olefin and at least 5 moles of HF with one mole of a member of the group consisting of Co₂O₃ and MnO₂, closing the reaction vessel, causing the temperature to rise above 0° C. to that at which the reaction proceeds rapidly, maintaining the mixture at at least the latter temperature until the reaction is complete and then separating the products.

13. The process of adding fluorine to a double bond of an acyclic chloro olefin consisting of carbon and chlorine which comprises mixing, in a reaction vessel at a temperature of from about −15° C. to about −78° C., from about 1 to about 4 moles of the olefin and from about 10 to about 20 moles of HF with one mole of a member of the group consisting of Co₂O₃ and MnO₂, closing the reaction vessel, causing the temperature to rise to a temperature of from 0° C. to about 200° C. at which the reaction proceeds rapidly, maintaining the mixture at at least the latter temperature until the reaction is complete and then separating the products.

14. The process of making CCl₂FCCl₂F by adding fluorine to the double bond of CCl₂=CCl₂ which comprises mixing, in a reaction vessel at a temperature below 0° C., at least 0.5 mole of the CCl₂=CCl₂ and at least 5 moles of HF with one mole of a member of the group consisting of Co₂O₃ and MnO₂, closing the reaction vessel, causing the temperature to rise above 0° C. to that at which the reaction proceeds rapidly, maintaining the mixture at at least the latter temperature until the reaction is complete and then separating the CCl₂FCCl₂F from the reaction mixture.

15. The process of making CCl₂FCCl₂F by adding fluorine to the double bond of CCl₂=CCl₂ which comprises mixing, in a reaction vessel at a temperature of from about −15° C. to about −78° C., from about 1 to about 2 moles of the CCl₂=CCl₂ and from about 10 to about 20 moles of HF with one mole of a member of the group consisting of Co₂O₃ and MnO₂, closing the reaction vessel, causing the temperature to rise to a temperature of from 0° C. to about 200° C. at which the reaction proceeds rapidly, maintaining the mixture at at least the latter temperature until the reaction is complete and then separating the CCl₂FCCl₂F from the reaction mixture.

16. The process of adding fluorine to a double bond of an acyclic olefinic compound which consists of carbon and at least one of the members of the group consisting of hydrogen, chlorine, bromine and fluorine which comprises mixing, in a reaction vessel at a temperature of below 0° C., at least 0.5 mole of the olefinic compound and at least 5 moles of HF with one mole of MnO₂, closing the reaction vessel, causing the temperature to rise above 0° C. to that at which the reaction proceeds rapidly, maintaining the mixture at at least the latter temperature until the reaction is complete and then separating the products.

17. The process of adding fluorine to a double bond of an acyclic chloro-fluoro olefin which comprises mixing, in a reaction vessel at a temperature below 0° C., at least 0.5 mole of the olefin and from about 5 to about 30 moles of HF with one mole of MnO₂, closing the reaction vessel, causing the temperature to rise above 0° C. to that at which the reaction proceeds rapidly, maintaining the mixture at at least the latter temperature until the reaction is complete and then separating the products.

18. The process of adding fluorine to a double bond of an acyclic chloro-fluoro olefin which consists of carbon, chlorine and fluorine which comprises mixing, in a reaction vessel at a temperature of from about −15° to about −78° C., from about 1 to about 4 moles of the olefin and from about 10 to about 20 moles of HF with one mole of MnO₂, closing the reaction vessel, causing the temperature to rise to a temperature of from 0° C. to about 200° C. at which the reaction proceeds rapidly, maintaining the mixture at at least the latter temperature until the reaction is complete and then separating the products.

19. The process of making CF₃CClFCCl₂F by adding fluorine to the double bond of

CF₃CCl=CCl₂ which comprises mixing, in a reaction vessel at a temperature below 0° C. at which the reaction proceeds slowly, at least 0.5 mole of the CF₃CCl=CCl₂ and at least 5 moles of HF with one mole of MnO₂, closing the reaction vessel, causing the temperature to rise above 0° C. to that at which the reaction proceeds rapidly, maintaining the mixture at at least the latter temperature until the reaction is complete and then separating the $CF_3CClFCCl_2F$ from the reaction mixture.

20. The process of making $CF_3CClFCCl_2F$ by adding fluorine to the double bond of $$CF_3CCl=CCl_2$$

which comprises mixing, in a reaction vessel at a temperature of from about —15° C. to about —78° C., from about 1 to about 2 moles of the $CF_3CCl=CCl_2$ and from about 10 to about 20 moles of HF with one mole of $MnO_2$, closing the reaction vessel, causing the temperature to rise to a temperature of from 0° C. to about 200° C. at which the reaction proceeds rapidly, maintaining the mixture at at least the latter temperature until the reaction is complete and then separating the $CF_3CClFCCl_2F$ from the reaction mixture.

ANTHONY F. BENNING.
JOSEPH D. PARK.

REFERENCES CITED

The following references are of record in the file of this patent:

UNITED STATES PATENTS

| Number | Name | Date |
|---|---|---|
| 2,062,743 | Daudt et al. | Dec. 1, 1936 |

Certificate of Correction

Patent No. 2,437,993.  March 16, 1948.

ANTHONY F. BENNING ET AL.

It is hereby certified that errors appear in the printed specification of the above numbered patent requiring correction as follows: Column 2, line 10, for the word "out" read *our*; column 5, line 6, Example III, for "CHl=CHCl" read *CHCl=CHCl*; column 7, line 16, claim 9, for "unil" read *until*; and that the said Letters Patent should be read with these corrections therein that the same may conform to the record of the case in the Patent Office.

Signed and sealed this 11th day of May, A. D. 1948.

[SEAL]

THOMAS F. MURPHY,
*Assistant Commissioner of Patents.* the reaction proceeds rapidly, maintaining the mixture at at least the latter temperature until the reaction is complete and then separating the $CF_3CClFCCl_2F$ from the reaction mixture.

20. The process of making $CF_3CClFCCl_2F$ by adding fluorine to the double bond of $$CF_3CCl=CCl_2$$

which comprises mixing, in a reaction vessel at a temperature of from about $-15°$ C. to about $-78°$ C., from about 1 to about 2 moles of the $CF_3CCl=CCl_2$ and from about 10 to about 20 moles of HF with one mole of $MnO_2$, closing the reaction vessel, causing the temperature to rise to a temperature of from $0°$ C. to about $200°$ C. at which the reaction proceeds rapidly, maintaining the mixture at at least the latter temperature until the reaction is complete and then separating the $CF_3CClFCCl_2F$ from the reaction mixture.

ANTHONY F. BENNING.
JOSEPH D. PARK.

REFERENCES CITED

The following references are of record in the file of this patent:

UNITED STATES PATENTS

| Number | Name | Date |
|---|---|---|
| 2,062,743 | Daudt et al. | Dec. 1, 1936 |

Certificate of Correction

Patent No. 2,437,993.                                      March 16, 1948.

ANTHONY F. BENNING ET AL.

It is hereby certified that errors appear in the printed specification of the above numbered patent requiring correction as follows: Column 2, line 10, for the word "out" read *our*; column 5, line 6, Example III, for "CHl=CHCl" read *CHCl=CHCl*; column 7, line 16, claim 9, for "unil" read *until*; and that the said Letters Patent should be read with these corrections therein that the same may conform to the record of the case in the Patent Office.

Signed and sealed this 11th day of May, A. D. 1948.

[SEAL]

THOMAS F. MURPHY,
*Assistant Commissioner of Patents.*